S. V. RAWLINGS.
MACHINE FOR MAKING AND SHARPENING DRILL BITS.
APPLICATION FILED MAR. 29, 1909.
1,140,396.
Patented May 25, 1915.
5 SHEETS—SHEET 1.
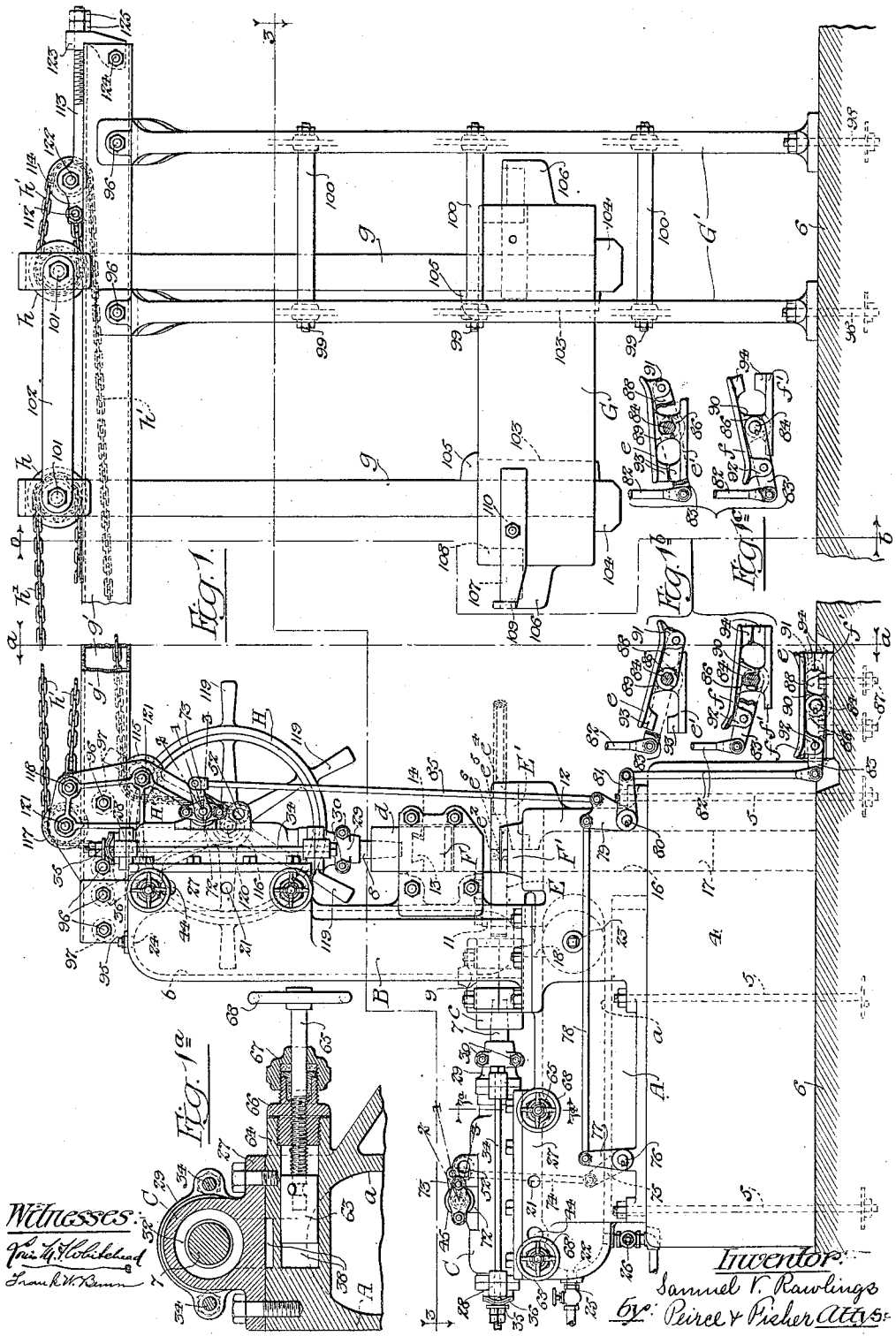

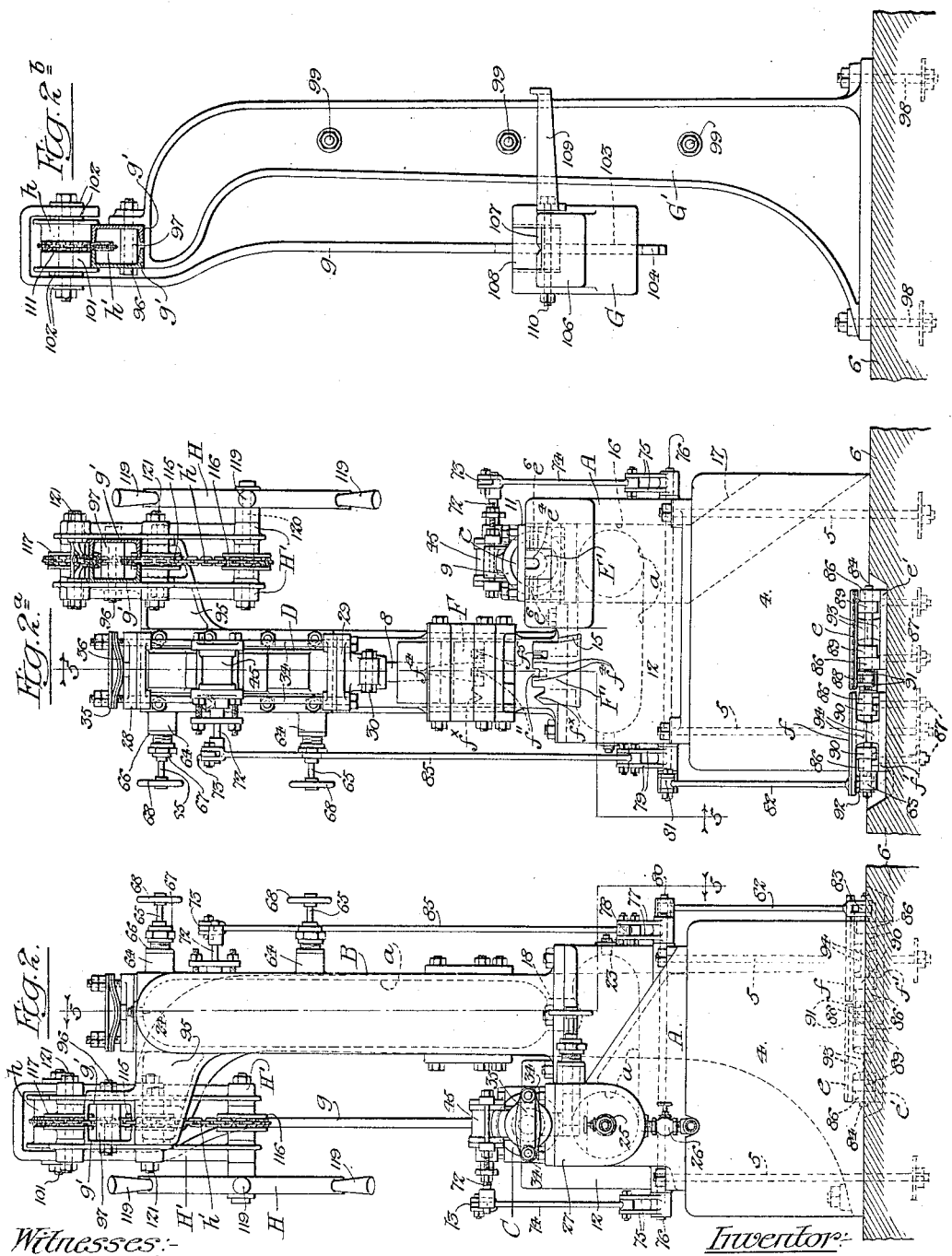

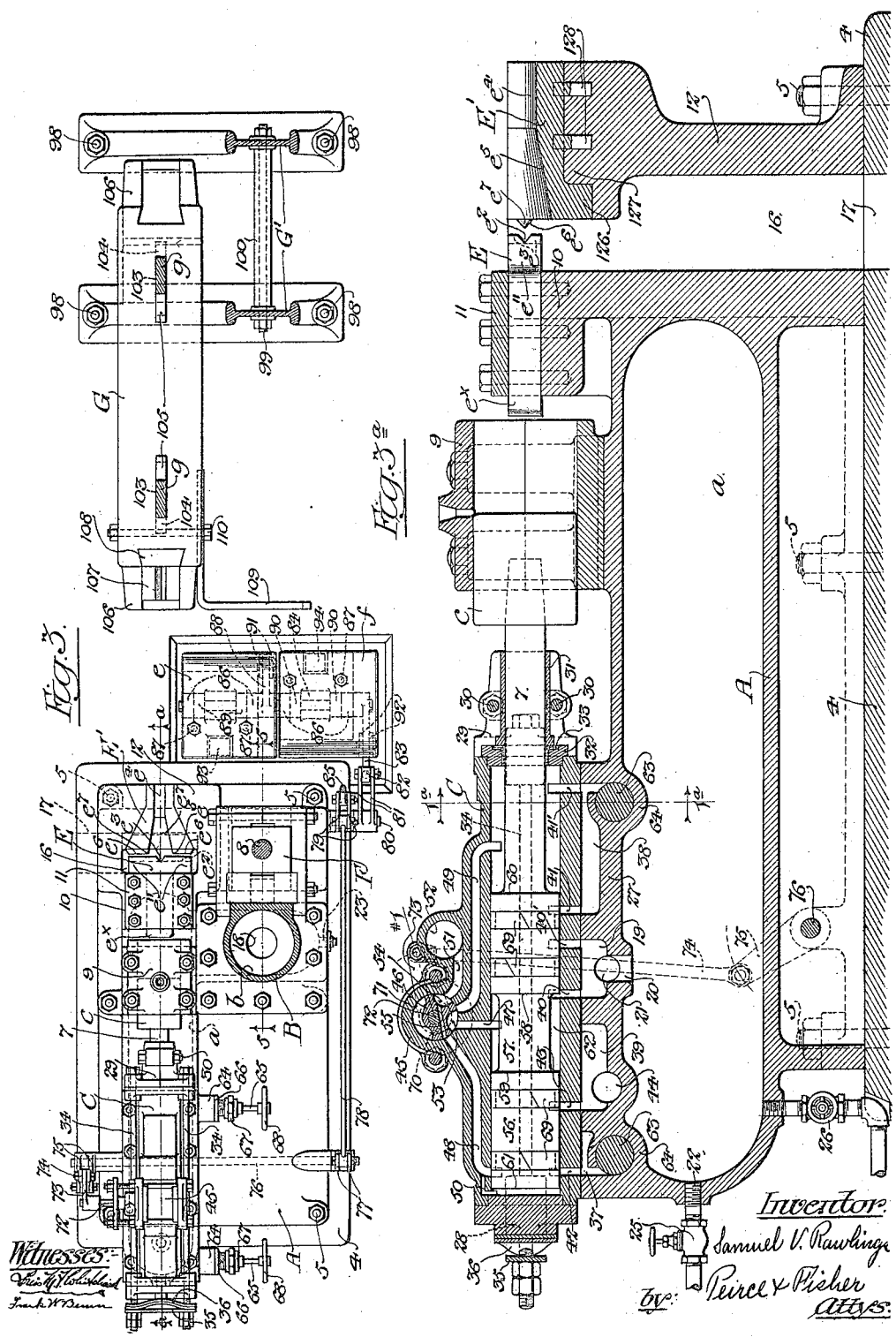

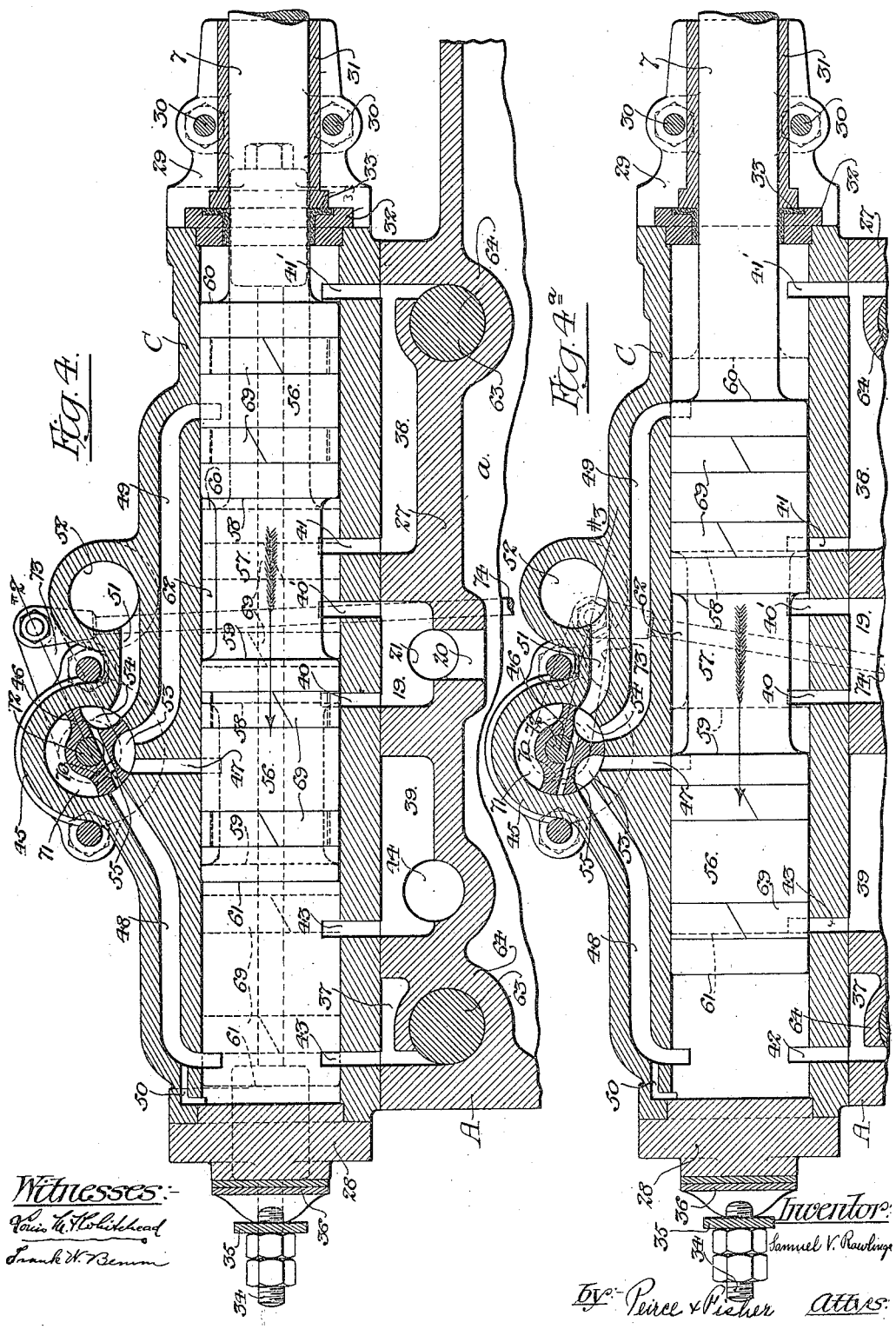

S. V. RAWLINGS.
MACHINE FOR MAKING AND SHARPENING DRILL BITS.
APPLICATION FILED MAR. 29, 1909.
1,140,396. Patented May 25, 1915.
5 SHEETS—SHEET 5.
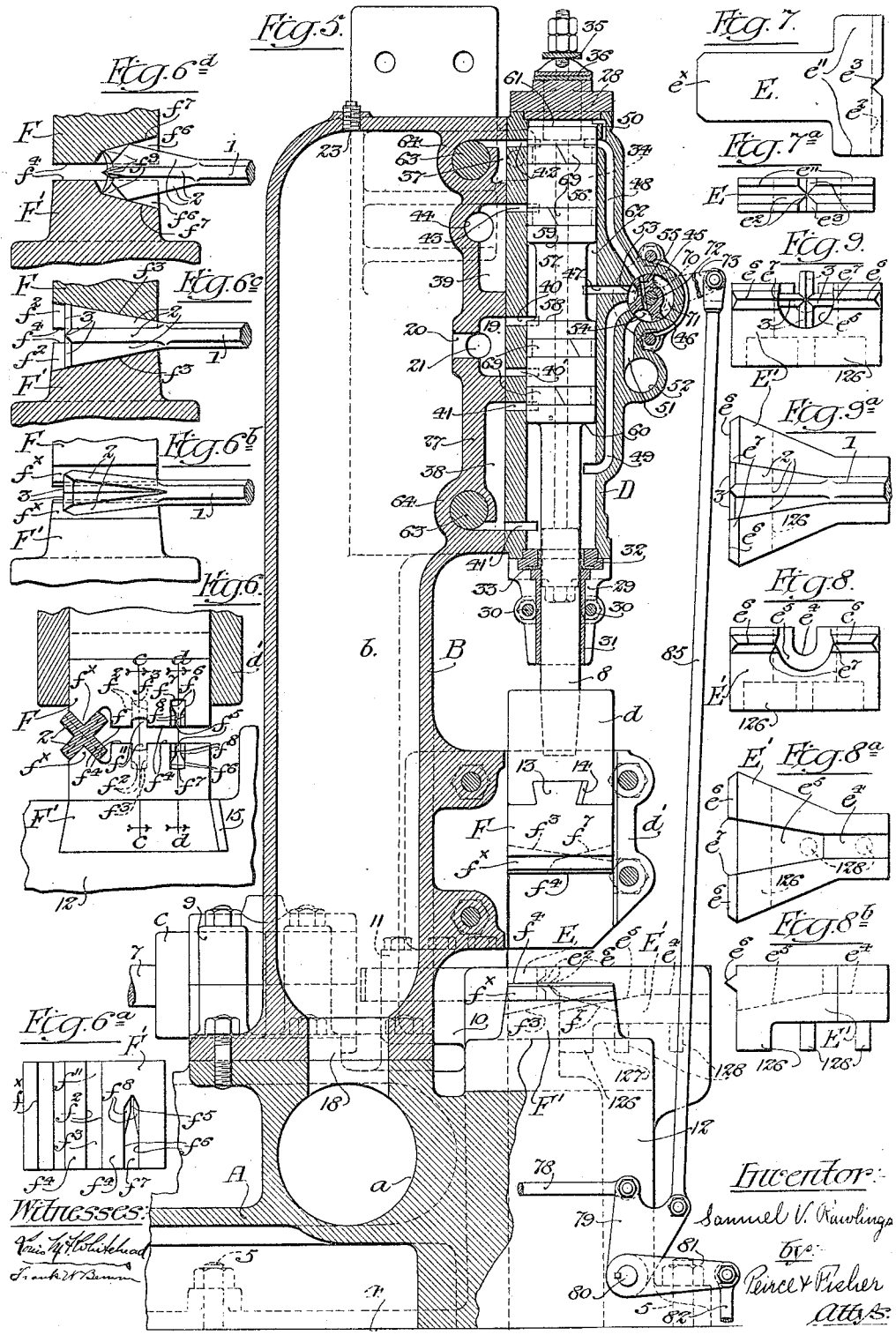

UNITED STATES PATENT OFFICE.

SAMUEL V. RAWLINGS, OF CALUMET, MICHIGAN.

MACHINE FOR MAKING AND SHARPENING DRILL-BITS.

1,140,396.   Specification of Letters Patent.   Patented May 25, 1915.

Application filed March 29, 1909. Serial No. 486,354.

*To all whom it may concern:*

Be it known that I, SAMUEL V. RAWLINGS, a citizen of the United States, and a resident of Calumet, county of Houghton, State of Michigan, have invented certain new and useful Improvements in Machines for Making and Sharpening Drill-Bits, of which the following is a specification.

The present invention relates to machines for manufacturing, shaping and sharpening drill bits and seeks to provide a machine of this sort which is substantial in structure and simple in design and in which the working and wearing parts are reduced to a minimum.

A further object of the invention is to provide a drill-making and sharpening machine with the operating tools and controlling parts conveniently accessible to the operator, so that a drill bit can be quickly and accurately made or sharpened with but a single "heat."

Further objects of the invention are to provide improved mechanism for starting and stopping the hammers and for controlling the operation thereof, the controlling means being arranged for convenient manipulation but so as to prevent the improper operation of both the upsetting and swaging hammers at the same time.

Still further objects of the invention are to provide improved tools for acting upon the point of the drill bit so arranged that the solidity of the steel at the point of the drill is maintained to give lasting and durable cutting qualities; and also to provide improved means for sharpening worn drill bits.

With these and other objects in view, the invention consists in the features of novelty and improvement hereinafter set forth, illustrated in the accompanying drawings and more particularly pointed out in the appended claims.

In the drawings, Figure 1 is a side elevation of the improved machine. Fig. $1^a$ is a detail section on the line $1^a$—$1^a$ of Figs. 1 and $3^a$; Fig. $1^b$ illustrates the position of the controlling shifters or foot pedals when the upset hammer is in operation; Fig. $1^c$ illustrates the position of the foot pedals when the swaging hammer is in operation. Fig. 2 is a rear elevation of the machine; Fig. $2^a$ is a front elevation with parts shown in section on the line $a$—$a$ of Fig. 1; Fig. $2^b$ is a section on the line $b$—$b$ of Fig. 1. Fig. 3 is a plan view of the lower portion of the machine with parts shown in section on the line 3—3 of Fig. 1; Fig. $3^a$ is a longitudinal section on an enlarged scale of the upsetting hammer taken on the line $a$—$a$ of Fig. 3. Figs. 4 and $4^a$ are longitudinal sections of the steam or pneumatic hammers showing the controlling valve in different positions. Fig. 5 is a detail view on an enlarged scale of the swaging mechanism, parts being shown in elevation and parts in section on the lines 5—5 of Figs. 2, $2^a$ and 3. Fig. 6 is a front elevation of the swaging dies; Fig. $6^a$ is a plan view of one of the swaging dies; Fig. $6^b$ is an end view and Figs. $6^c$ and $6^d$ are sectional views thereof taken on the lines $c$—$c$ and $d$—$d$ respectively of Fig. 6 and showing the tool in position in the different portions of the dies. Figs. 7 and $7^a$ are plan and face views respectively of the upsetting dolly. Figs. 8, $8^a$ and $8^b$ are end, plan and side views respectively of the upset anvil die. Figs. 9 and $9^a$ are similar to Figs. 8 and $8^a$ but showing the drill in position in the upset anvil die.

The drills manufactured and sharpened by the improved machine may be of different forms. That shown in Figs. $6^b$, $6^c$, 9 and $9^a$, comprises a shank 1 and a cutting or bit end having a series of flaring wings 2 with V-shaped cutting edges 3. The drill bit shown in the drawings is provided with four wings at right angles to one another and is the form most commonly employed, but the machine may be used to manufacture and sharpen drill bits in which the wings and cutting edges are otherwise arranged. The machine comprises an upsetting hammer and suitable dies for upsetting the end of a rod from which the drill is made, for forming the V-shaped cutting edges 3 and for sizing the drill bits. It is also provided with a swaging hammer and suitable dies or tools for forming the wings 2 of the drill bit and for "fullering" the bit point of worn or broken drills.

The machine frame, in the form shown, comprises two cast sections, a horizontal base section A and a vertical section B. The horizontal section is mounted upon a base block 4 and is secured thereto by bolts 5. These bolts also serve to anchor the machine to a suitable foundation or floor 6. The horizontally acting, upsetting hammer is carried at one side of the horizontal frame section A on the line a—a of Fig. 3. The upright section B is mounted at its opposite side of the horizontal frame section and adjacent its forward end and is bolted thereto as shown. The upright frame section carries the vertically operating swaging hammer on the line 5—5 of Fig. 3. The upset hammer cylinder C is bolted to the rear end of the base frame A and the swage hammer cylinder D is bolted to the upper end of the upright frame section B. These cylinders are provided with pistons and piston rods 7 and 8 and are arranged respectively on the offset center lines a—a and 5—5 of Fig. 3. The upset hammer head c is fixed to the forward end of the piston rod 7 and the swage hammer head d is fixed to the lower end of the piston rod 8, so that the upsetting and swaging tools operated by these hammers are arranged adjacent each other at the forward part of the machine and within easy access of the operator.

A guide bearing 9 (see Fig. 3ª) for the upset hammer head c is bolted to the forward part of the base frame A. This hammer is arranged to operate upon an upsetting dolly E which is arranged in a suitable seat or guide-way in an upwardly projecting portion 10 at the forward end of the base frame A. A plate 11 bolted to the portion 10 holds the upsetting dolly in position. The upsetting dolly E coöperates with an upset anvil die E' mounted upon the forward or anvil portion 12 of the base frame. The swage hammer head d (see Fig. 5) moves in a guide d' and is provided with a dovetailed groove on its lower end arranged to receive a correspondingly shaped projection 13 upon the upper end of the swaging die F, the swaging die being secured to the hammer head c by a key 14. The swaging die F coöperates with an anvil die F' which, as most clearly shown in Fig. 2ª, is provided with a dovetailed lower portion that is seated in a correspondingly shaped recess in the upper face of the anvil portion 12 of the base frame. A key 15 removably locks the swage anvil die F' in place.

The forward end or anvil portion 12 of the base frame A, is solid and heavy to absorb the blows of the hammers, and particularly of the swaging hammer, except that it is cored out to form a passage way 16 (see Figs. 2ª and 3ª) which leads downwardly from between the dolly E and upset anvil die E' and communicates with an inclined passage 17 extending through the supporting base block 4. The scale and chippings from the drill bits operated upon by the upsetting tools, drop out of the way through these passages 16 and 17. The remaining portion of the base frame A is cored out so that it is light and strong in construction and so also as to form a chamber or reservoir a for compressed air which will usually be employed for operating the hammers. The upright frame section B is similarly cored out to form a chamber b and this chamber communicates with the chamber a through a passage way 18 formed in the abutting portions of the two frame sections. The cylinders C and D are provided with inlet chambers 19 which communicate respectively with the chambers a and b through openings 20. The chambers 19 are provided with inlet openings 21. The chamber a is provided with inlet openings 22 and 23 at its ends and the chamber b is provided with an inlet opening 24 at its upper end. A supply pipe for air under pressure may be connected to any one of these openings to supply air to both chambers a and b and to both hammer cylinders C and D. In the drawings, a valved supply pipe 25 is shown connected to the opening 22. The other inlet openings are closed by suitable plugs. The chambers a and b form a reservoir for the compressed air in which oil, dirt and the like, can settle to the bottom of the chamber a and can be blown out by opening a blow-out valve 26 connected to the rear, lower end of the chamber a. By this arrangement, clean air is supplied to the cylinders of both the pneumatic hammers. These cylinders are bolted to suitable seat portions 27 formed upon the frame sections A and B. The joint between the two frame sections and the joints between the frame sections and the cylinder are all made air tight.

The construction of the pneumatic cylinders C and D are alike in all respects. Each is provided with an outer head 28 which fits in the outer end of the cylinder, and a sectional inner head 29 which abuts against the inner end of the cylinder. The sections of the inner head 29 are connected by bolts 30 and a bushing 31, arranged between the sections, bears upon the piston rod. A ring 32 interposed between the head and the end of the cylinder, carries a packing leather 33 about the piston rod. The two heads are provided with projecting lugs (see Fig. 3) through which extend bolts 34 on opposite sides of the cylinder. The heads of these bolts bear upon the lugs of the inner head 29. The nuts on the outer ends of these bolts bear upon a cross-bar 35. A double leaf spring 36 is interposed between the outer cylinder head and the cross-bar 35 and is provided with openings through which the bolts 34 extend. These springs will yield slightly to cushion the blow and prevent injury in case the piston in the cylinder strikes either head.

The seat portion 27 upon which the cylinder is mounted, is cored out to form the inlet chamber 19, two expansion chambers 37 and 38 and an exhaust chamber 39. The bottom wall of the cylinder is provided with two ports 40 and 40' which communicate with the ends of the inlet chamber 19, with two ports 41 and 41' which communicate with the ends of the expansion chamber 38 at the inner end of the cylinder, with a port 42 that communicates with the outer end of the expansion chamber 37 at the outer end of the cylinder, and with a port 43 which communicates with the outer portion of the exhaust chamber 39. This exhaust chamber is provided with an opening 44 leading to the atmosphere. The outer portion of the cylinder is provided with a cored raised part which forms the valve casing 45 for a rotary controlling valve 46. A port or passage way 47 leads from the valve casing to the mid portion of the cylinder. Ports or passage ways 48 and 49 lead from the valve casing 45, at points on opposite sides of the port 47, and extend through the cylinder walls and open into cylinder adjacent the opposite ends thereof. Both these ports open into the cylinder at points that are spaced some distance from the head but the port 48 opens into the cylinder at a point much closer to the adjacent head than does the port 49 and a small restricted port 50 leads from the passage 48 to the extreme outer end of the cylinder. An exhaust port 51 also leads from the valve casing to an opening 52 which communicates with the atmosphere. The controlling valve 46 is provided on its under side with two cut-out spaces 53 and 54 and with a small restricted opening 55 extending through the valve from the space 54 and over the space 53. The piston 56 is provided with a central, reduced portion 57 so as to form the shoulders 58 and 59 which respectively control the inlet ports 41 and 47 for the opposite ends of the cylinder. The ends 60 and 61 of the piston control the ports 48 and 49.

The controlling valve 46 is shown in its two extreme positions in Figs. 4 and 4ª. When the controlling valve is in the position shown in Fig. 4ª, the piston and hammer are reciprocated. In this position of the valve, the space 53 thereof connects the inlet ports 47 and 48 and the space 54 connects the port 49 with the exhaust port 51. When the controlling valve is in the position shown in Fig. 4, the hammer is held out of operation with the piston adjacent its outer end. In this position of the valve, the space 53 connects the port 47 with the passage 49 and the restrictive opening 55 connects the passage 48 with the exhaust-port 51.

When the hammer is in operation, as stated, the controlling valve is in the position shown in Fig. 4ª. The space 62 about the reduced portion 57 of the piston, is always in communication with the inlet chamber 19 through one or the other of the ports 40 or 40'. If we assume that the piston is in the position shown in full lines in Fig. 4ª and moving in the direction of the arrow, the shoulder or edge 59 is about to uncover the port 47 to admit air under pressure to the outer end of the cylinder through said port, the space 53 of the valve and the port or passage 48. At the same time, the shoulder or end edge 60 of the piston uncovers the port 49 to connect the inner end of the cylinder with the exhaust 52 through the port 49, space 54 of the valve and port or passage 51. The air is thus admitted into the outer end of the cylinder in time to cushion the return stroke of the piston made in the direction of the arrow and the air thus passing into the outer end of the cylinder fills this end of the cylinder, the passage 48 and the expansion chamber 37 and forces the piston forwardly upon its forward stroke or in the direction opposite to that indicated by the arrow. This forward stroke continues until the piston again reaches the position shown in full lines in Fig. 4ª, when the inlet port 47 is cut off by the shoulder 59 and the air in the outer end of the cylinder, in the passage 48 and in the chamber 47 acts by expansion upon the outer end of the piston 61 until the latter uncovers the exhaust port 43. This places the outer end of the cylinder in communication with the exhaust opening 44 and at the same time, the shoulder 58 of the piston uncovers the port 41 to place the expansion chamber 38 and the inner end of the cylinder in communication with the source of supply. The piston is shown in dotted lines in Fig. 4ª in position about to open the ports 43 and 41. Air is then exhausted from the outer end of the cylinder and admitted from the source of supply through the port 41, expansion chamber 38 and port 41' to the inner end of the cylinder to cushion the power stroke and force the piston back on its return stroke. When the piston again arrives to the position shown in dotted lines in Fig. 4ª, the port 41 is closed and the air in the chamber 38 and in the inner end of the cylinder act by expansion until the piston reaches the position shown in full lines when the port 49 is uncovered by the end 60 of the piston to place the inner end thereof in communication with the exhaust 52, and the inlet 47 is uncovered by the shoulder or edge 59 of the piston to place the outer end of the cylinder in communication with the source of supply.

In the form illustrated, each end of the cylinder is placed in communication with the source of supply at the same time that the other end is connected to the exhaust. The inlet to each end is cut off before the exhaust is open, so that the air in the cylinder end and in the expansion chamber communicating therewith, act by expansion to continue the stroke of the piston. The size of the expansion chambers 37 and 38 is so proportioned relatively to the size of the cylinder and the pressure of the air supply, that they will act as reservoirs of sufficient volume for air under pressure to impart the required energy to the piston upon its forward and return strokes. Preferably, means are provided for varying the volume of these expanded chambers to adapt machines to the varying air pressures used at different plants and to the fluctuations in the air pressure at different times during the day at the same plant. For this purpose, each of these chambers is provided with a plug 63 which fits within a cylindrical portion 64 thereof (see Figs. 1$^a$ and 4). A screw 65 is connected to the plug 63 and extends through and is threaded to a bushing 66 which in turn is threaded into the outer end of the cylindrical portion 64. A stuffing box 67 surrounds the screw stem 65 and the latter is provided at its outer end with a hand-wheel 68. By means of the hand-wheel and screw, the plugs 63 may be shifted back and forth to vary the volume of the expansion chambers 37 and 38.

If no means are provided for varying the volume of these expansion chambers, the blow of the hammer will be too great when the pressure of the air supply is high, and the blow of the hammer will not be sufficient to do its work when the air pressure is low. But, by means of the adjustable plugs 63, the volume of the expansion chambers 37 and 38 may be reduced when the air pressure is above normal and increased when the air pressure is below normal, so that the piston velocity and the blow struck by the hammer may be maintained at the desired normal in spite of the variations in pressure of the air supply.

The air is admitted to both ends of the cylinder in time to cushion the forward and return strokes. The distance between the port 41 and the inner cylinder head is less than the distance between the port 47 and the outer cylinder head, so that air is admitted to the inner end of the cylinder later in the stroke and there is less resistance or cushioning action to the forward or power stroke of the piston than there is given to the return or idle stroke thereof and more air is admitted to the outer end than to the inner end since, of course, it requires less power to effect the return or idle stroke than it does to effect the forward or power stroke. The piston is provided with suitable packing rings 69 which cover the several ports and which also prevent the leaking of air from port to port.

From the foregoing description, it will be seen that the motor cylinder is "valveless" in operation. That is to say, its own piston acts as a valve to alternately connect the opposite ends of the cylinder with the source of supply and the exhaust. The valve 46 may, however, be shifted by hand to alternately connect the opposite ends of the cylinder to the supply and exhaust, as hereinafter described, when it is desired to strike light blows with the hammer. The primary function, however, of this valve is as a starting and stopping valve.

In the normal, idle position of the machine, the controlling valve 46 occupies the position shown in Fig. 3$^a$, which position is intermediate those shown in Figs. 4 and 4$^a$. For convenience in describing the operation of this valve, normal intermediate position is designated as No. 1 and the extreme positions shown respectively in Figs. 4 and 4$^a$, are designated as positions No. 2 and No. 3. In the position No. 3 of the controlling valve, the piston and hammer connected thereto are reciprocated as previously described. In both the positions Nos. 1 and 2, the port 47 is connected to the passage 49 by the space 53 of the valve, so that the inner end of the cylinder is in communication with the source of air supply and the piston is held back in idle position adjacent the outer cylinder head, as shown in Fig. 3$^a$. At the same time, the reduced passage way 55 of the valve connects the port 48 and the port 51 and places the outer end of the cylinder in communication with the exhaust 52. This port 55 is of small size, so that the exhaust from the outer end of the cylinder is restricted to cushion the movement of the piston toward the outer head when the valve is shifted into position No. 1 or No. 2. As the piston approaches the outer head, it cuts off the passage 48 and the movement is further cushioned through the restricted passage 50. This restricted passage also acts during the normal operation of the motor cylinder to admit air to the extreme outer end of the cylinder to cushion the return stroke of the piston and also to start the piston, in case the latter covers the port 48. It will thus be seen that, whatever its position, the piston will be moved to and held in idle position adjacent the outer cylinder head, when the controlling valve is shifted either to its No. 1 or No. 2 position. For example, if the piston is in the position shown in Fig. 4 and the valve is shifted to the No. 2 position there shown, the piston will be quickly moved back to the position shown in Fig. 3$^a$, first by the admission of air to the inner end of the cylinder through the port 41' and then by the admission of air thereto through the port 49.

The normal position (No. 1) of the controlling valves is shown in Figs. 3$^a$ and 5. The valve shifting mechanism is so arranged that the operator can move the controlling valve of either hammer cylinder back and forth between its No. 1 and No. 3 positions to alternately admit and exhaust air to and from the opposite ends of the cylinder to effect light hammer blows or of less power than those normally effected when the controlling valve is shifted to position No. 3 and left in that position. A hole 70 is drilled through the controlling valve 46 and leads from the cut-out space 53 thereof to the space 71 above the valve, so that air under pressure is always maintained in this space to hold it seated upon the exhaust ports 49 and 51 upon the ports 47 and 48.

The motor cylinders and controlling valve of both the vertical swaging hammer and the horizontal upsetting hammer (see Figs. 3ª and 5), are alike. Each controlling valve is fixed to a suitable stem 72 which extends outwardly through a suitable stuffing box in one of the heads of the cylindrical valve casing 45, and is provided with a crank arm 73. The crank arm 73 of the upset hammer cylinder, is connected by a downwardly extending link 74 (see Figs. 1, 2, 2ª and 3) to a crank arm 75 upon one end of a cross rock shaft 76. This rock shaft is journaled in the lower, rear portion of the horizontal base frame A and carries the crank arm 75 at one end and a crank arm 77 at its opposite end. This crank arm is connected by a forwardly extending link 78 to a bell crank 79 mounted upon a stub shaft 80. This stub shaft is journaled in the forward portion of the base frame and is provided with a horizontally and forwardly extending rock arm 81 which, in turn, is connected by a vertically depending link 82 to a rock arm 83 on a shaft 84. The crank arm 73 connected to the controlling valve of the swaging hammer is connected by a vertically depending link 85 to the bell crank 79.

The rock shaft 84 extends transversely in front of the machine and is journaled in suitable bearings 86 upon a pair of plates $e'$ and $f'$ which are arranged within a recess in the foundation and are secured thereto by anchor bolts 87. At one end, the rock shaft is provided with the horizontal rearwardly extending crank arm 83 and midway between its ends the shaft is provided with a horizontally and forwardly extending crank arm 88. A pair of foot pedals $e$ and $f$ are arranged above the base plate $e'$ and $f'$ and are provided on their under sides with depending forked lugs 89 and 90 which fit over the rock shaft 84. These lugs also fit between the bearing lugs 86 to hold the foot pedals against lateral movement. The foot pedal $e$ is provided on its forward end with a pair of depending lugs 91 which engage and are pivoted to the crank arm 88. The foot pedal $f$ is provided on its rear end with a similar pair of lugs 92 which fit over and are pivoted to the crank-arm 83.

A pair of abutting stop lugs 93 are formed upon the forward ends of the pedal $e$ and base plate $e'$ and a similar pair of abutting stop lugs 94 are formed upon the forward end of the pedal $f$ and base plate $f'$. In the normal or idle position of the parts, both foot pedals are horizontal with their abutting pairs of stop lugs 93 and 94 in contact. With the arrangement set forth, the forward end of the foot pedal $e$ can be depressed to shift the rock shaft 84 in one direction from normal and thus raise the link 82, and the rear end of the foot pedal $f$ can be depressed to move the rock shaft in the opposite direction from normal and pull down upon the link 82. Moreover, either pedal can be rocked upon its center axis to move the rock shaft 84 in one direction, and back again to normal position, but pressure cannot be applied to either pedal to rock the shaft in the opposite direction from normal. When either foot pedal is operated, the other foot pedal is rocked upon its pair of abutting stops and is thus lifted away from the rock shaft 84. Fig. 1ᵇ shows the position of the two pedals when the forward end of the pedal $e$ is depressed to shift the rock shaft in one direction. Fig. 1ᶜ shows the position of the two pedals when the pedal $f$ is depressed to move the rock shaft in the opposite direction.

When both pedals are in normal, horizontal position, the controlling valves of both the upsetting and swaging hammers are in their No. 1 position, as shown in Figs. 1, 3ª and 5, and the pistons of both cylinders are held in idle position out of the way adjacent the outer cylinder heads and with the hammer heads withdrawn or at the back end of their movement. The foot pedal $e$ controls the upsetting hammer. When the forward edge of the foot pedal $e$ is depressed into the position shown in Fig. 1ᵇ, the controlling valve of the upsetting hammer cylinder C is shifted to its operative position No. 3, shown in Fig. 4ª, and the upset hammer is thrown into operation. At the same time, the controlling valve of the swage hammer cylinder D is moved to its No. 1 position in which the piston and hammer are still held idle at the outer end of their movement.

When the rear end of the foot pedal $f$ is depressed into the position shown in Fig. 1ᶜ, the controlling valve of the upsetting hammer cylinder C is moved to its No. 1 position shown in Fig. 4, and the upsetting hammer is thrown out of operation and drawn back to the outer end of its movement. At the same time, the controlling valve of the swaging hammer cylinder D is shifted to its No. 3 position, which is similar to that shown in Fig. 4ª, and the swaging hammer is reciprocated. It is obvious that with this arrangement it is impossible for the operator, through carelessness or inattention, to throw both hammers into operation at the same time. Moreover, when one hammer is in operation, it must be brought to a standstill before the other can be operated. The foot pedal $e$ can be rocked on its axis in one direction from and back to normal position to move the valve of the cylinder C between its No. 1 and No. 3 positions shown in Figs. 3ª and 4ª, and thereby controls the admission and exhaust to the cylinder in such a manner as to cause the upsetting hammer to strike light blows. Similarly, the foot pedal $f$ can be oscillated from and back to normal position in the opposite direction to cause the swaging hammer to strike light blows. The foot pedals are located in front of the machine at the operator's position and are readily and easily accessible so that the operator can quickly and readily control the operation both of the upsetting and swaging hammers.

When the swaging hammer is in operation, the bit is placed upon the swage anvil die F', and the heavy anvil portion 12 of the base frame A and the foundation block 4 absorb the force of the blows. When the upsetting hammer is in operation, the bit end of the drill is placed upon the upset anvil die E' and a supplementary anvil is provided for engaging the opposite end of the drill to absorb the blows. This supplemental or pendulum anvil is in the form of a heavy, cast metal block G that is suspended by a pair of hangers $g$ from an overhead track. This track (see Figs. 1, 2, 2ª and 2ᵇ) comprises a pair of channel bars $g'$ which are supported at one end upon an offset lug or bracket 95 at the upper end of the upright frame section B and at the other end upon the upper end of a pair of standards G'. The channel bars $g'$ are bolted to the bracket 95 and to the upper ends of the standards G' by bolts 96. These bolts are provided with spacing sleeves 97 for holding the channel bars $g'$ in position with their flanges spaced slightly apart, as shown in Figs. 2, 2ª and 2ᵇ. The standards G' are secured to the foundation 6 by bolts 98 and are connected together by bolts 99 having spacing sleeves 100 mounted thereon. The upper ends of the standards are offset to correspond with the position of the offset bracket 95 upon the upright frame section B, and the track bars $g'$ are supported in line with the upsetting hammer.

A pair of flanged, rollers $h$ run on the track formed by the bars $g'$ and the axle pins or shafts 101 of these rollers are secured to the hangers $g$. The upper ends of the hangers are preferably of inverted U-shape and engage both ends of the axle pins 101. Below the track bars, the hangers are offset, as clearly shown in Fig. 2ᵇ, so that the center of gravity of the pendulum anvil G will be directly below the center of its supporting track. Sets of connecting bars 102 extend between the axle pins 101 of the rollers $h$, the outer set of connecting bars being held against the outer faces of the bent U-shaped end portions of the hangers by units on the axle pins 101 and the inner set of connecting bars being interposed between the ends of the rollers and the inner faces of the upper ends of the hangers. The lower ends of the hangers $g$ extend through openings 103 in the anvil G and are provided at their lower ends with offset lugs 104 that engage the under side of the anvil. The hangers are secured to the anvil by keys 105 inserted in the openings 103. When the swage hammer is in operation, the bit end of the drill is placed in the upset anvil die E' and its opposite end rests upon a rearwardly projecting lug 106 on the end of the anvil and abuts against the end face thereof. The projection 106 and the end of the anvil are provided with steel wear plates 107 and 108 fitted in dovetailed grooves therein. The wear plate 107 is provided with a groove in its face to receive the end of the drill. An L-shaped bar 109 is seated in a recess in the side of the anvil and is secured thereto by a bolt 110. The laterally projecting portion of this bar serves as a support for the tail end of the drill when its bit end is being operated upon by the swage hammer. The anvil thus serves to absorb the blows of the upsetting hammer and also serves to support the tail end of the drill when the latter is being operated upon both by the upsetting hammer and the swaging hammer. In the form shown, the anvil G is provided at both ends with the projections 106 and with the seats for the wear plates 107 and 108 and for the bar 109, so that either end of the anvil can be used.

A chain mechanism is preferably employed for adjusting the pendulum anvil back and forth so as to properly engage the ends of drills of different lengths. For this purpose, the rollers $h$ are provided with chain grooves 111 and a chain $h'$ is connected at one end by an anchor bolt 112 to a take-up 113 and extends over the adjacent roller $h$; thence back over a guide wheel 114 mounted on the take-up, through the space formed by the two channel bars $g'$, over a guide wheel 116 upon the shaft of a large hand wheel H; thence upwardly over a guide wheel 117 and forwardly over the adjacent chain roller $h$ and then back to an anchor bolt 118. The wheel H is provided with suitable hand holds 119 and it is readily accessible to the operator who can quickly shift the pendulum anvil to any desired position by rotating the hand wheel H in one or the other direction.

The shaft 120 of the hand-wheel is journaled in the lower end of a pair of brackets H', the chain wheel 116 on the shaft being arranged between these brackets. The upper ends of the brackets H' fit over the track bars $g'$ and are connected above and below these bars by shouldered spacing bolts 121 and by the anchor bolt 118. The bolts 121 form the axle pins for the guide wheels 115 and 117. Two of the bolts 97 also pass through the brackets H'. The axle pin 122 of the guide wheel 114 is mounted upon the take-up 113. The latter is threaded and extends through a tail block 123 that is connected by a bolt 124 to the outer end of the track bars $g'$. Nuts 125 upon the outer end of the take-up, serve to adjust the latter to place the proper working tension upon the chain $h'$. The spaces between the flanges of the bars $g'$ serve as guides for the chain $h'$.

The upset dolly E (see Figs. 3ª, 7 and 7ª) is T-shaped, having laterally extending side portions $e''$ and a stem $e^x$ fits within the grooved guide portion 10 at the anvil end of the base frame. The face of the dolly is provided with a female die portion that consists, in the particular form shown, of a horizontal V-shaped groove $e^2$ for forming the V-shaped cutting edges 3 upon the ends of the wings 2 of the drill bit. The faces of the tools set forth are of the particular form necessary for making and sharpening drills having the common "cross-bit," that is, having four wings arranged at right angles to one another. The dies are removably mounted in position in the machine, and it will be understood that different dies may be employed for forming drill bits of different sizes and in which the wings of the bit are otherwise arranged. The V-shaped groove $e^2$ of the dolly is designed to form V-edges 3 upon two diametrically opposite wings of the cross-bit. Vertical V-shaped notches $e^3$ are formed in the face of the dolly at right angles to the groove $e^2$ for receiving the V-shaped edges of the vertically disposed wings of the bit.

The upset anvil die E' is removably mounted in a recess in the anvil portion 12 of the base frame (see Figs. 3 and 3ª). It is provided on its rear end with a depending lug 126 that abuts against a shoulder 127 on the anvil portion 12. Dowel pins 128 may also be provided, if desired, to hold the anvil die in position. The upper face of the anvil die is provided with a recess formed of two portions, viz., a straight portion $e^4$ and a flaring portion $e^5$. The bottom part of the straight portion $e^4$ is cylindrical, while the bottom part of the flaring portion $e^5$ is conical. The axis of the cylindrical and conical portions is below the upper face of the die (see Figs. 3ª and 8) and is in line with the V-shaped groove $e^2$ of the upsetting dolly E. The walls of the recessed portions $e^4$ and $e^5$ above this axis, are vertical. The recess $e^5$ is of proper size to receive the flaring wings 2 of the bit to be made or sharpened. The rear face of the upset anvil die is provided with projecting, V-shaped male portions $e^6$ which are adapted to fit the V-shaped groove $e^2$ of the projections $e''$ on the T-shaped head of the dolly. The head of the dolly, as is clear from Fig. 3, is considerably wider than the recess $e^5$ of the anvil die E', so that it overlaps the portions of the die carrying the male V-shaped projections $e^6$. In operating on the drill bit, it is placed in the anvil die with two of the wings in line with the V-shaped projections $e^6$. When the dolly, by the operation of the upset hammer, is brought into engagement with the upset anvil die, the steel of the bit at the corners of the wings is guided to proper place against the corners or anvil points $e^7$ at the inner ends of the V-shaped projections $e^6$. The corners or anvil points $e^7$ sustain the steel of the bit at the corners of the wings during the upsetting operations and prevents it from curling. The steel of the bit is thus solidly compacted at its weakest point, i. e., at the corners of the wings. Moreover, by the use of this peculiar anvil die, the drill bits will be brought to the required diameter. Upsetting dollies having V-shaped recesses in working faces have been used heretofore, but an upsetting dolly having extended end portions $e''$ or a wide face in combination with an anvil die having V-shaped male projections for fitting the groove of the dolly and for sustaining and sizing the drill points, constitute an important part of the present invention.

The working portions of the dolly and of the anvil die are narrower, in vertical direction, than the face of the drill bit, so that only a part of the bit face is operated upon at the same time. The drill is placed in the anvil die in the position shown in Figs. 9 and 9ª, so that the two horizontal wings are operated upon and then is given a quarter turn to complete the operation of the dolly upon the bit face. By employing a narrow dolly of this sort, which strikes only upon a portion of the bit face, a sort of "pening" is obtained upon the steel and the latter is thereby spread more rapidly. It will be understood that the dolly E and upset anvil die E' may be changed to form bits of different sizes and also to form bit faces in which the wings are arranged otherwise than in a cross and at right angles to one another.

The swage hammer and anvil die F and F' (see Figs. 6, 6ª and 6ᵇ) are provided with similar opposed faces. At one side they are provided with the V-shaped points $f^x$, the faces of which are at an angle of forty-five degrees to the horizontal and at right angles to each other. These swage points are employed for forming the V-shaped indentations, between the wings 2 of the drill bit, as shown in Figs. 6 and 6^b. Central recesses $f''$ formed in the faces of the dies F and F' are provided with straight, parallel side walls $f^2$ and with flaring or inclined top and bottom walls $f^3$. These recesses, together with the flat, opposed faces $f^4$ of the hammer and anvil dies, constitute a wing swage for swaging and sizing the wings 2 of the drill bit. When the drill bit is in position in the wing swage formed by the recesses $f^2$, the flat faces $f^4$ on opposite sides of the recesses strike the flat sides of the horizontal wings of the bit to bring the same to proper size, and the inclined faces $f^3$ strike upon the edges of the vertical wings to swage and compact the metal body thereof and to bring them to proper size.

The swage hammer and anvil dies F and F' are provided with a "fullering" swage formed by the recesses $f^5$. These recesses are provided with parallel side walls $f^6$, top and bottom walls $f^7$ that are inwardly inclined toward each other and angular faces $f^8$ at the inner portions of the recesses $f^5$, which, as clearly shown in Figs. 6^a and 6^d, do not extend entirely across the face of the dies F and F'. The faces $f^8$ of the fullering swage are inclined both to the vertical and to the horizontal, and are adapted to upset and swage the corners of a worn bit into a V-shape.

In operation, air under pressure is admitted to the reservoirs $a$ and $b$ of the frame, whereupon the pistons and hammer heads move back to their outer position ready for operation. The bars from which the drills are to be made, are heated in a suitable furnace adapted to heat a number of bars at the same time so that the supply of bars shall be continuous to the operator of the machine. Usually a number of drill bits of one size are made at the same time and the upset anvil die E' for the proper size is inserted in position in the anvil. The pendulum anvil G is adjusted by shifting the wheel H into proper position to engage the tail end of the bar to be operated upon, while the other or heated end is placed in the upset anvil die with its end extending a little beyond the inner face thereof, so that the dolly will not come in contact with the anvil face in striking a blow. The operator's position is directly in front of the machine where he can readily inspect the operation of the machine and, by means of the hand-wheel H and the shifters or pedals $e$ and $f$, readily control the operation. When the bar is in position, with its tail end against the face of the anvil G and its heated end in the upset anvil die E', the operator shifts the foot pedal $e$ and sets the upset hammer in operation to strike the dolly E which, in turn, delivers the blow to the heated end of the bar. After a few blows have been struck, the bar is given a quarter turn and the operation continued until the heated end of the bar has been upset into a conical form with a V-shaped cross upon its face formed by the grooves $e^2$ and $e^3$ of the dolly. The foot pedal $e$ is then brought to a horizontal position and the upset hammer moves back to its outward, idle position. The heated end of the bar is then removed to the swaging dies F and F' with its opposite end resting upon the projecting arm 109 of the anvil. The heated end of the bar is placed between the swaging points $f$ and the swaging hammer is set in operation by tilting the pedal $f$ so that the indentations between the wings 2 are formed, first in one-half of the drill bit and then in the other half by giving the bar a quarter turn. The drill bit is then removed to the wing swage formed by the recesses $f''$ where the wings are shaped up to proper size. The bar is then returned to the V-swage $f^x$ for another blow or two. The pedal $f$ is then brought to horizontal position so that the swaging hammer moves to its uppermost or idle position out of the way. The heated end of the bar is then removed to the upset anvil die E' with its edge a little beyond the inner face thereof. The upset hammer will then be placed in operation and the workman will guide the drill bit back into the anvil die E', while the dolly E is striking on the end of the bit to fill the die.

The operator guides the drill bit back into the anvil die with the wings of the bit in line with the V-shaped projections $e^6$ so that the corners $e^7$ of these projections support the corners of the wings of the bit and the metal at the corners is solidly compacted and the bit is brought to proper size. The operator guides the drill bit back into the anvil by shifting the pendulum anvil through the medium of the hand-wheel H and continues this movement until the dolly E is in close proximity to the face of the anvil die E', when the drill bit is completed with the V-shaped edges 3 properly formed by the recess $e^2$ upon the face of the dolly. It is understood that during the operation, the dolly operates first upon the two diametrically opposite wings and then by giving the drill a quarter turn upon the other two wings. It will also be understood that the dolly and anvil die may be modified to form drill bits in which the wings are arranged otherwise than in a cross with the wings at right angles to one another.

In most machines heretofore used, it is necessary to heat the bar at least twice before the drill can be completed. With the present improved machine, having the V-swage $f$ and the wing swage $f'$ upon the swaging hammer and anvil dies, and having the upset anvil dolly and die E and E', the wings of the bit can be quickly formed and the drill bit then brought quickly to proper size in the upset anvil die at the same time that the V edges 3 are formed upon its face. In this way, the workman does not have to stop from time to time to test the drill bit with a gage. The dies of the machine bring the bit to proper size without such testing, thus effecting a great saving of time and rendering it possible to form the drill bit with but a single heat. To shape bits of the same form but of different sizes, it is only necessary to change the upset anvil die E′ which is readily removable.

After a drill becomes worn and blunted, the corners of the wings and V-edges are rounded off and are sometimes cracked or broken. In sharpening a worn bit with the present improved machine, the worn bit is first heated and is placed between the "fullering" swage recesses $f^5$ of the swaging hammer and anvil dies F and F′. This hammer is then set in operation and a few blows are struck so that the faces $f^7$ and $f^8$ of the fullering recesses $f^5$ upset and swage the corners of the worn bit into the form shown in Fig. 6$^d$. The metal at the corners of the worn drill bit are not only upset but is also contracted or thinned into V-shaped points by the faces $f^8$ of the fullering swage as indicated at $f^9$ in Fig. 6$^d$. In machines heretofore constructed, the thinning of the corners and the upsetting of the metal of the corners of the worn drill bit have been performed in two separate operations but with the fullering swage herein set forth the metal of the worn bit is distributed at a single operation so that it may then be subjected at once to the operation of the upsetting dolly.

After the worn bit has been formed into the shape shown in Fig. 6$^d$, it is withdrawn slightly from the fullering recesses $f^5$, so that the faces $f^4$ of the dies on opposite sides of the recesses may strike the wings a slight blow or two in case the "fullering" action has thickened the wings to any extent. The drill is then shifted to the upset anvil die E′ where its tail end is placed against the face of the pendulum anvil G and the bit end in the recess of the upset anvil die with its point extending somewhat beyond the face of the die. The upsetting hammer is then set in operation, so that the dolly strikes the face of the bit and is upset. As the dolly operates, the workman guides the bit back into the upset anvil die E′ with two of the V-shaped edges in line with the projections $e^6$ on the face of the anvil. The operator thus guides the drill back until the dolly is in close proximity to the face of the anvil when the sharpening is completed. If the wings 2 of the drill have been thickened by the upsetting operation, the wing swaging recesses $f'$ are employed to swage the wings slightly and the drill is then returned to the upsetting tools to be touched up by a few light blows and have its point brought to proper size by the upset anvil die E′.

The pedals which control the operation of the hammers and the hand-wheel which controls the adjustment of the pendulum anvil are within easy reach of the operator and the entire machine may be quickly and readily controlled. The supporting and adjusting means for the pendulum anvil are arranged at the top of the machine out of the way of the operator and do not interfere with his ready access to the front of the machine. The standards G′ which carry the supporting track are offset at their upper ends, as shown in Fig. 2$^b$, so that the anvil may pass by the standards, as shown in Fig. 1. The space necessarily occupied by the machine is thereby reduced. If long drills are to be manufactured and a long track provided for the pendulum anvil, additional supporting standards G′ may be employed.

It is obvious that numerous changes may be made in the details set forth without departure from the essentials of the invention.

I claim as my invention:—

1. In drill shaping machines, the combination with the frame, of a horizontal upset hammer mounted on said frame, an anvil arranged in front of said frame for engaging the tail end of the drill, an overhead support from which said anvil is suspended and means for adjusting said anvil to and from said frame.

2. In drill shaping machines, the combination with the frame, of a horizontal upset hammer mounted thereon, an overhead support extending forward from said frame, a pendulum anvil hung from said support in front of said upset hammer, means for adjusting said anvil along said support and a shifter for said adjusting means at the front portion of said frame.

3. In drill shaping machines, the combination with the frame, of a horizontal upset hammer mounted thereon, an overhead track extending forwardly from said frame, rollers on said track, depending hangers connected to said rollers, a pendulum anvil sustained by said hangers in front of said upset hammer, and means connected to said rollers for adjusting said hangers and anvil along said track.

4. In drill shaping machines, the combination with the frame, of a horizontal upset hammer mounted thereon, an overhead track extending forwardly from said frame, rollers on said track, depending hangers having connected upper end portions of inverted U-shape in which said rollers are journaled, a pendulum anvil sustained by said hangers in front of and in line with said upset hammer, means for adjusting said hangers and anvil along said track, and a shifter for said adjusting means at the front of said machine frame.

5. In drill shaping machines, the combination with the frame, of a horizontal upset hammer mounted thereon, an overhead track extending forwardly from said frame, two connected rollers on said track, hangers depending from said rollers, a pendulum anvil carried by said hangers in front of and in line with said upset hammer, a hand wheel journaled at the front of the machine, a guide wheel at the other end of said track and a flexible connection extending between said hand wheel and said rollers and over said guide wheel for adjusting said hangers and anvil back and forth along said track.

6. In drill shaping machines, the combination with the frame, of a horizontal upset hammer mounted thereon, an overhead track extending forwardly from said frame in the same vertical plane with said upset hammer, two connected chain rollers mounted on said track, a pendulum anvil suspended from said rollers in front of said upset hammer, a chain wheel at the inner end of said track, a guide wheel at the outer end, a chain fixed at its ends to the opposite ends of said track and extending in opposite directions respectively around said chain rollers and over said guide and chain wheels and means for rotating said chain wheel in opposite directions to adjust said pendulum anvil along said track.

7. In drill shaping machines, the combination with the frame, of a horizontal upset hammer mounted thereon, an overhead track in the same vertical plane with said hammer and supported at its inner end on said frame, a standard supporting the outer end of said track, a pair of connected chain rollers on said track, depending hangers having upper end portions of inverted U-shape in which said rollers are journaled, a pendulum anvil suspended from said hangers in line with said upset hammer, a take-up carrying a guide wheel at the outer end of said track, a chain wheel at the inner end of said track, a chain fixed at its ends to said take-up and to the inner end of said track and passing in opposite directions respectively about said chain rollers and around said chain and guide wheels, and a hand wheel mounted at the front of the machine frame and connected to said chain wheel, said track being formed of a pair of channel bars having inwardly extending flanges spaced apart to form a guide way for said chain.

8. In drill shaping machines, the combination with the frame, of an upset hammer thereon, a dolly operated by said hammer and having a groove in its face for forming the cutting edges of the drill bit, and a coöperating upset anvil die arranged in line with said dolly, said die having a recess to receive the bit end of the drill and projection on its face adapted to enter the groove of said dolly and sustain the corners of the drill bit during the unsetting operation.

9. In drill shaping machines, the combination with the frame, of an upset hammer thereon, a dolly operated by said hammer and having a groove in its face for forming the cutting edges of the drill bit, and a coöperating upset anvil die arranged in line with said dolly, said die having a recess to receive the bit end of the drill and a male projection on its face mating with the groove of said dolly, the inner end face of said projection coinciding with the side wall of said recess.

10. In a drill shaping machine, the combination with the frame, of a horizontal, power-driven upset hammer mounted thereon, an upset dolly removably mounted in a guide-way on said frame and arranged to be struck by said hammer, a coöperating upset anvil die having a recess therein to receive the bit end of the drill, removably mounted on the machine in line with said dolly, said dolly having a face portion wider than the recess of said die with edge-forming grooves formed therein, and said die having male projections on its face leading from the side walls of said recess and mating with the grooves of said dolly.

11. In a drill shaping machine, the combination of an upset hammer, an upsetting dolly operated thereby and a coöperating upset anvil die having a recess with a semiconical lower portion to receive the bit end of the dolly, said dolly having a face portion wider than said recess with edge-forming, V-shaped grooves therein, and said die having V-shaped male projections mating with the grooves of said dolly, the inner end faces of said projections coinciding with the side walls of said recess and arranged to sustain the wing corners of the drill bit during the upsetting operation.

12. In a drill shaping machine, the combination with horizontal and upright frame portions and an anvil at the intersection thereof, of motor-operated upsetting and swaging hammers mounted respectively on said horizontal and said upright frame portions, a dolly having an edge-forming groove in its face mounted in a guide-way on said anvil and operated by said upset hammer, a coöperating die, having a recess and projections on its face for sizing the drill bit, mounted on said anvil, coöperating swaging dies having V-shaped and wing forming portions mounted respectively on said swaging hammer and said anvil, and controlling means for said hammers.

13. In a drill shaping machine, the combination of a horizontal upset hammer, a dolly having edge-forming grooves in its face operated by said hammer, a coöperating upset anvil die having a recess therein for receiving the bit end of the drill and male projections on its face mating with the grooves of said dolly and arranged to sustain the wing corners of the drill bit, an anvil for engaging the tail end of the drill to absorb the blows of said hammer, and means for adjusting said anvil to and from said upsetting die whereby the drill bit can be guided back into the recess of said die with its wings in line with said projection during the upsetting operation.

14. In a drill shaping machine, the combination with the frame, of a swage hammer, and swage hammer and anvil dies mounted on said frame, said dies having fullering recesses shaped to upset and pinch out the wing corners of worn drill bits at the same operation.

15. In a drill shaping machine, the combination with a frame, of a power-driven swage hammer mounted thereon, coöperating swaging dies removably mounted on the head of said hammer and on said frame, and provided with fullering recesses in the faces thereof, said recesses having parallel side walls, flaring top and bottom walls and angular faces at the inner ends of said recesses arranged to simultaneously upset and reduce to V-shape the wing corners of worn bits.

16. In drill shaping machines, the combination with horizontal and upright frame portions and an anvil at the intersection of said frame portions, of power-driven upsetting and swaging hammers mounted respectively on said horizontal and on said upright frame portions, a dolly having edge-forming grooves in its face, mounted in guide-ways on said anvil, a coöperating die, having a recess for sizing the drill bit, mounted on said anvil, coöperating swage dies, having wing forming and fullering recesses, mounted respectively on said swage hammer head and on said anvil, a supplemental anvil for engaging the tail end of the drill to absorb the blows of the upset hammer, and having projections for upholding the tail end of the drill when the bit end is in position either in the upsetting or the swaging dies, means for adjusting said supplemental anvil to and from said dies, and means for controlling said upsetting and swaging hammers.

SAMUEL V. RAWLINGS.

Witnesses:
ALBERT H. FLOETER,
WILLIAM M. HARRIS.

Copies of this patent may be obtained for five cents each, by addressing the "Commissioner of Patents, Washington, D. C."